Patented Feb. 7, 1950

2,497,046

UNITED STATES PATENT OFFICE 2,497,046

FLUORINATION OF POLYMERIC MATERIALS

Edward L. Kropa, Old Greenwich, Conn., assignor to American Cyanamid Company, New York, N. Y., a corporation of Maine No Drawing. Application October 12, 1945, Serial No. 622,088

6 Claims. (Cl. 260—92.1)

This invention relates to the fluorination of high molecular weight organic compounds which contain a relatively small proportion of hydrogen.

High molecular weight compounds, including polymers of unsaturated substances have been widely used to seal joints in chemical apparatus in the form of gaskets, paints, washers, as impregnants for fibrous materials to be used in packings, etc. Most of these high molecular weight compounds are resistant to ordinary chemicals and are therefore satisfactory for many purposes. However, many of the corrosive chemicals will attack, and in many cases entirely destroy the conventional materials heretofore employed.

Recently polymers of unsaturated materials containing a high proportion of fluorine have been proposed for applications requiring resistance to highly corrosive substances. The polymers of unsaturated materials containing high proportions of fluorine such as for example, polymers of tetrafluoroethylene are resistant to almost every solvent or corrosive material. However, polymers of tetrafluoroethylene are very difficult to handle or manipulate inasmuch as they do not soften sufficiently upon the application of heat to render them sufficiently plastic to be molded easily. Furthermore, they cannot be dissolved in any known solvents and, accordingly, they cannot be used in solution form.

One of the objects of this invention is to provide chemical resistant materials.

Another object of the present invention is to provide materials which are resistant to solvents and corrosive substances but which may be readily formed and/or dissolved in solvents prior to a fluorine treatment which renders them chemically resistant.

Still another object of the present invention is to prepare heat-stable materials.

A further object of the present invention is to gas-harden preformed high molecular weight products.

One other object of the present invention is to provide sheets, fibers, threads which are spun from fibers, fabrics woven from such threads, molded products, laminated materials and coatings which have resistance to solvents and corrosive chemicals and which are also extremely heat-resistant.

Another object of the present invention is to provide chemically resistant polymers of other high molecular weight materials which may be drawn into fibers or films, or which may be molded or cast to form shaped objects.

These and other objects are attained by processes including fluorinating a high molecular weight synthetic aliphatic polymer containing less than 5% of hydrogen, as for example, by means of free fluorine either before or after the polymer is converted into the final form for its intended use. Since products having more than about 2% of hydrogen tend to decompose upon direct fluorination, my invention is especially directed to the fluorination of high molecular weight polymers containing about 2% or less of hydrogen and still more particularly, to fluorination of polymers containing no hydrogen such as for example, polymers of difluorodichloroethylene, trifluorochloroethylene, tribromofluoroethylene, etc.

The following examples in which the proportions are in parts by weight are given by way of illustration and not in limitation.

Example 1

Oriented crystalline fibers of polymeric trifluorochloroethylene are placed in a suitable cell and the cell is maintained at about room temperature i. e., 20–30° C. Nitrogen is passed through the cell to displace air and thereby remove oxygen. Following this, fluorine gas is introduced, preferably diluted with nitrogen in a weight ratio of fluorine to nitrogen of about 1:10. The ratio of fluorine to nitrogen is gradually increased over a period of 24 hours until the ratio is about 10:1. The resulting product has excellent heat stability and is resistant to substantially every known chemical having solvent properties, or being corrosive, and it possesses good electrical properties.

Example 2

Example 1 is repeated except that the temperature is raised to about 50° C. for about 8 hours. Similar results are obtained.

Example 3

Fluorine gas is passed through a tube of polymeric trifluorochloroethylene a few days at room temperature. If the tube be cut and scrapings removed from the inner part of the tube it will be found that the surface polymer contains about 8% more fluorine than the original polymer. Furthermore, the inner surface of the tube becomes somewhat more resistant to the action of corrosive chemicals and solvents than the original polymer.

The product prepared above may, if desired, be further treated at about 100° C. with fluorine to fluorinate the material further.

Example 4

A tube of a copolymer of vinyl chloride and vinylidene chloride is treated with fluorine gas in the manner described in Example 3 except that it is preferable that the fluorine be diluted with a relatively inert gas such as nitrogen at the start of the operation. After 1 to 24 hours the concentration of the fluorine is gradually increased until the tube is in contact with pure fluorine for from 1 to 24 hours or more. It is desirable that the concentration of fluorine at the start be about 10% by weight of the total gas being passed through the tube. It is also desirable that precautions be taken to avoid contact with oxygen since this may cause the polymeric tube to burn. The effect of oxygen is readily demonstrated if the tube is allowed to exhaust to the open air since it will start to burn at the open air end quite frequently. This is apparently due to the formation of fluorine oxide. The fire hazard may be avoided by exhausting the gas from the tube into an inert atmosphere or into a vacuum.

A tube treated in accordance with this example is much more resistant to fluorine and other corrosive chemicals and solvents after treatment in accordance with the foregoing description. Shavings from the inside of the tube are no longer soluble in the same solvent in which the initial polymer is readily soluble. The treatment of the tube with fluorine causes it to darken progressively as additional quantities of fluorine and oxygen are adsorbed.

Example 5

Polymeric trifluorochloroethylene in the form of a powder is placed in a pressure vessel and sufficient carbon dioxide is introduced into the vessel to form sufficient liquid carbon dioxide to cover the polymer. Carbon dioxide gas is slowly bled from the pressure vessel until all traces of oxygen have been removed. Fluorine gas is introduced into the pressure vessel slowly, and optionally, the fluorine gas may be diluted with further quantities of carbon dioxide. During the introduction of the fluorine a mixture of fluorine and carbon dioxide, together with any other gases which may be present, is bled from the pressure vessel. The fluorine concentration is gradually increased until the pressure vessel contains substantially pure fluorine. The final polymer is a highly resistant material somewhat similar to polymers of tetrafluoroethylene.

Example 6

42 parts of trans- 1-fluoro-2-chloroethene (B. P. —4° C.) and 0.3 part of benzoyl peroxide is heated at about 50° C. in a pressure vessel for about 13 days. The product is a viscous liquid from which some solid polymer separates and which contains some unreacted monomer. The unreacted monomer is permitted to evaporate from the product after removing the latter from the vessel. The solid white porous brittle polymer is extracted with hot methanol and the resulting material has a softening point of about 120° C. and is soluble in benzene.

The polymer prepared in accordance with the foregoing description is placed in a suitable reaction vessel and treated with fluorine diluted with an inert vapor such as nitrogen so that the concentration of fluorine in the gas is about 10% or less. After 1–8 hours the concentration of the fluorine is increased, preferably gradually, until the polymer is in contact with substantially pure fluorine gas. After the polymer has become substantially unreactive toward fluorine a material is obtained which is resistant to solvents and heat. The product is no longer soluble in benzene or similar solvents.

Example 7

Example 6 is repeated except that 55 parts of cis- 1-fluoro-2-choloroethene (B. P. 16° C.) are substituted for the trans-compound and the polymerization is carried out for 18 days. The resulting polymer has a softening point of about 130° C. and is soluble in benzene. After fluorination the product is no longer soluble in benzene and similar solvents and is quite similar to the product prepared in accordance with Example 6.

Example 8

A copolymer of 31 parts of trifluorochloroethylene and 22 parts of vinyl chloride obtained by polymerization thereof in the presence of about 0.2 part of tertiary butyl hydroperoxide at about 25° C. for 30 days and which contains about 3% of combined trifluorochloroethylene, is fluorinated in accordance with the procedure described in Example 6. The fluorinated product is considerably more resistant to solvents and to heat than the copolymer before fluorination.

Example 9

A wax-like polymer obtained by the thermal cracking of a polymer of trifluorochloroethylene is treated with fluorine in the manner described in Example 3 or 6, and it is found that the fluorine treatment improves the heat stability and chemical resistance of the material. Furthermore, the electrical properties of the fluorinated materials prepared in accordance with this example are superior to the untreated wax.

Example 10

An electrical conductor such as electrical wire is coated with a composition comprising a high proportion of polyvinyl chloride. The coated conductor is treated with dilute fluorine gas preferably after or simultaneously with a treatment of chlorine. When the fluorination has proceeded far enough so that the reaction is readily controlled the concentration of fluorine may be increased until the material is in contact with pure fluorine and after from 1–24 hours a product is obtained which is heat resistant and which has excellent electrical properties.

Example 11

A powdered vinylidene chloride polymer is suspended in a moving stream of a gas including fluorine maintained at a temperature of about 25° C. The concentration of the fluorine is preferably 10% or less at the beginning of the operation the balance being some relatively inert gas or chlorine. The rate of flow of the gas is controlled so that the particles of the polymer are continuously agitated and thereby contacted with the gas and at the same time the rate is kept low enough so that most of the particles will be retained in the reaction vessel. The residual fine particles of polymer may be removed for example in a cyclone separator and returned to the reaction vessel for further reaction, or in some cases the fines may be substantially fluorinated after one pass through the apparatus to be used for the production of molded or extruded articles. As the fluorination proceeds the concentration of fluorine gas is gradually increased until the particles of polymer are in contact with substantially pure fluorine. When the product is sufficiently fluorinated, i. e., after about 1–24 hours a product highly resistant to heat and solvents is obtained. A product prepared in accordance with this example may be used as a heat-resistant filler in the molding of other resinous materials or they may be formed under high pressure and high temperature.

Example 12

Example 11 is repeated except that the temperature of the reaction is maintained at about 0° C. In accordance with this example the reaction proceeds much more slowly and is more readily controlled and, accordingly, if desired, the products may be prepared according to this method which contains a relatively low proportion of fluorine. Such products have a higher degree of plasticity at elevated temperatures and yet are more chemically resistant than products which are not treated with fluorine.

Example 13

A fabric comprising filaments of a copolymer of vinyl chloride and vinylidene chloride (weight ratio about 15:85) is treated with fluorine gas in the manner described in Example 1. The resulting fluorinated fabric is chemically resistant and considerably more heat stable than the untreated fabric. It is especially suitable for use in the filtering of corrosive chemicals and for use in filtering hot liquids.

Example 14

A gasket of a polymer of trifluorochloroethylene is treated with fluorine in the manner described in Example 1. After treatment the gasket has a highly resistant surface coating of highly fluorinated material and is in effect a gas hardened product.

Example 15

A copolymer comprising about 85% of vinylidene chloride and 15% of vinyl chloride is extruded in the form of a filament or a fiber and this is drawn through a chamber which is maintained under pressure and which contains an inert gas, then into another chamber into which fluorine is introduced together with an inert gas. If desired, the filament may be passed through successive chambers containing higher concentrations of fluorine in order to obtain rapid reaction and as complete fluorination as possible. The resulting fiber or filament is resistant to chemicals and heat and in some cases, the tensile strength is increased. The gas hardened filament is suitable for weaving into fabrics for many varied uses where heat resistance or chemical resistance is desired.

Other polymers which may be treated in accordance with the present invention are polymers of the halogen substituted ethylenes, particularly those which contain some fluorine, e. g., trifluorobromoethylene, trifluoroiodoethylene, 1,1-difluoro-2,2-dichloro ethylene, 1,1-dibromo-2,2-difluoro ethylene, cis- and trans- 1,2-dichloro-1,2-difluoro ethylene, cis- and trans- 1,2-dibromo-1,2-difluoro ethylene, 1,1-difluoro-2-chloro-2-bromo ethylene, vinylidene bromide, 1-fluoro-1-chloro ethylene, as well as trifluoroacetic acid ester ethylenes such as the polyvinyl ester of trifluoroacetic acid, etc. Still other polymers which may be fluorinated in accordance with this invention are chlorinated polyethylene, polymers of chlorinated methyl silicon oxides, as well as polymers produced from chlorinated methyl silicon chlorides, chlorinated methyl silicon fluorides, and chlorinated di($\beta,\gamma$ dichloro-n-propyl) silicon chlorides and copolymers of any of the monomers of the substances mentioned in the axamples or in the foregoing list of polymeric materials. Any of these polymers or copolymers are preferably highly chlorinated i. e., containing at least 50% of chlorine or at least 50% of chlorine and some other halogen. Furthermore, my invention is particularly adapted to the fluorination of the high molecular weight polymers, i. e., those having a molecular weight of at least 10,000.

The fluorination of high molecular weight materials in accordance with this invention is preferably carried out on products containing 2% or less of hydrogen, but in some cases the fluorination may be conducted on substances having up to as much as 5% of hydrogen. With compounds having from 2–5% of hydrogen it is desirable that the fluorination be conducted only after, or simultaneously with, a chlorination process in order to avoid undesirable side reactions, and in order to avoid the decomposition of the material being fluorinated. Even with products containing hydrogen in proportions of 2% or less, the fluorination reaction must be carefully controlled, and a preliminary chlorination is often desirable. Instead of chlorination, bromination may also be used in some cases.

Whenever hydrogen is present in a composition to be fluorinated the reaction is preferably conducted with dilute fluorine gas containing a relatively high concentration of an inert gas such as nitrogen, carbon dioxide and tetrafluoromethane, hexafluoroethane, helium, argon, etc.

It is preferable that the reaction be carried out under substantially anhydrous conditions and also in the absence of oxygen or organic compounds containing oxygen between two carbon atoms or attached to one carbon atom. If such organic compounds be present, or if oxygen be present, fluorine oxide may be formed and this is so highly reactive that it may cause decomposition of the material being treated, or it may cause undesired reactions and degradation reactions.

Notwithstanding the fact that generally oxygen should not be present, nevertheless, small traces of oxygen or fluorine oxide may be used as a catalyst in some cases particularly, when the materials to be fluorinated are not particularly reactive and contain very little or no hydrogen. Other substances which may be used as fluorination catalysts or in some cases, as a flourinating agent, are antimony trifluoride, antimony fluorochloride ($SbF_3Cl_2$), mixtures of antimony trifluoride and antimony pentachloride, iodine, silver fluoride, silver perfluoride, cuprous chloride, silver chloride, cuprous bromide, cuprous iodide, zinc chloride, cobalt chloride, nickel chloride, ferric bromide, etc. Aside from the use of a small proportion of 1–10% of the foregoing substances as catalysts in the reaction of fluorine with high molecular weight substances, those substances containing fluorine may be employed as fluorinating agents without the use of any fluorine or in relatively large proportions along with comparable proportions of fluorine gas.

The reaction may be carried out at temperatures varying widely between about −30° C. up to about 100° C. In some cases even higher temperatures may be employed although generally speaking the reaction of fluorine with other substances is so rapid that high temperatures should be avoided. With varied reactive materials temperatures around 0° C. or below are useful and even temperatures below −30° C. may be required to control reaction in some cases. Many of the fluorination reactions of high molecular weight compounds are advantageously carried out at about room temperatures i. e., 20–30° C., particularly if the concentration of fluorine which is employed at the beginning of the reaction is low and if the concentration is increased only gradually as the reaction proceeds.

The reaction may be carried out at atmospheric pressure but in many fluorinations it is advantageous to employ elevated pressures of from 1–50 atmospheres or more.

Generally, I prefer to carry out my fluorination reactions with fluorine gas diluted with an inert gas. However, in some cases it may be desirable to carry out the fluorination in a liquid medium such as, for example, liquid carbon dioxide, hydrofluoric acid, fluorosulfonic acid, hexafluoroethane, difluorodichloroethane, trifluorotrichloroethane, tetrafluorodichloroethane, or the liquids obtained by cracking the trifluorochloroethylene polymers. Inasmuch as most of the high molecular weight materials which are fluorinated in accordance with this invention are insoluble in almost every solvent after fluorination there is little advantage in the use of a liquid reaction medium in most cases. However, if the material to be fluorinated is soluble before fluorination it may be advantageous to use a liquid reaction medium at least until the material is sufficiently fluorinated to become insoluble. After this, the insoluble material may be contacted with fluorine gas in the absence of a liquid medium. It is also possible to carry out the fluorination by introducing fluorine into a suspension or dispersion of the material to be fluorinated in a suitable dispersing medium such as one of the liquids mentioned above.

When materials containing chlorine or bromine are fluorinated the chlorine or bromine set free may be scrubbed from the fluorine gas and the fluorine may then be recirculated.

Prechlorination, prebromination of any of the materials which contain hydrogen is often desirable. In many cases this may be accomplished by suspending or dissolving the material to be chlorinated in carbon tetrachloride, hexachloroethane or similar chlorinated solvent, or the product may be suspended in water. The solution is contacted with chlorine gas and irradiated with light or else the reaction may be carried out under pressure with liquid chlorine. The chlorine may be continuously withdrawn from the reaction vessel and the HCl absorbed by means of a basic material, and, therefore, the purified chlorine may be returned to the reaction vessel. In some cases substances capable of absorbing HCl may be added to the reaction vessel.

One of the methods of following the fluorination of high molecular weight compounds in accordance with this invention is by measuring the maximum rise in the dissipation factor as a function of frequency. With trifluorochloroethylene the maximum in the dissipation factor appears at 1000 cycles at which point the dielectric constant is 2.53 and the dissipation factor is 0.0271. Thus, when the dissipation factor falls, it is apparent that fluorination is beginning, and when the dissipation factor becomes substantially constant it is clear that the fluorination is complete.

Dyes, pigments, fillers may be mixed with polymers treated in accordance with this invention if desired. However, in most instances the fluorinated polymers are especially useful without the addition of other substances inasmuch as they have extremely high heat resistance, high chemical inactivity and good strength. For most purposes the introduction of fillers is undesirable inasmuch as this will tend to reduce the desirable properties of my fluorinated materials. However, fluorinated materials produced in accordance with this invention may be employed as binders for abrasives since they have high heat resistance and such high strength that abrasive articles produced therefrom have excellent wearing characteristics. Among the abrasives which may be mixed with my fluorinated materials a few examples are, silicon carbide, aluminum oxide, silica fluoride, diamond dust, garnet, etc. Many polymeric materials such as trifluorochloroethylene polymers are capable of being drawn or extruded in the form of ribbons, fibers or filaments, or in the form of thin films. In order to increase the strength of all of these, it is desirable that they be cold-drawn so that the polymers become oriented in the direction of the drawing. The fibers, filaments or films are preferably drawn before the fluorination treatment since it is more difficult to work them after fluorination, and, as a matter of fact, one of the advantages of the present invention is that polymers may be fabricated into their final shape while still in such a condition that they are easily manipulated and therefore, after fluorinated rendering them resistant to heat, corrosive chemicals and further manipulation, or a change in form.

Fibers or filaments of fluorinated polymers produced in accordance with this invention may be used in the manufacture of felt or paper-like materials, or they may be spun into the form of threads and the latter woven into cloth. The fibers may be produced in the form of stable fiber and spun or twisted into the form of threads, or it may be made as continuous fibers which may be spun or twisted into the form of threads. Filaments or twisted fibers of my fluorinated crystalline polymers may be braided into cords or rope, and such cords are particularly suitable as tire cords because of their high heat resistance.

Because of the chemical resistance of filaments of crystalline polymers produced in accordance with this invention, they may be made into brushes for a wide variety of domestic and industrial uses. Tapered filaments of polymers may be fluorinated in accordance with this invention. Along with the domestic uses for which these brushes are of value are hair brushes, brushes for bottle washing machines, dry-cleaning brushes, paint brushes, etc. Filaments of polymers produced in accordance with my invention are inert, they may be readily sterilized, and they may be tied in hard knots. Accordingly, they may be used as surgical sutures.

Other uses for polymers of fluorinated polymers produced in accordance with this invention are as fishing lines and leaders, in the manufacture of screens for various industrial uses including filtering, as strings for musical instruments, etc.

Fabrics of crystalline oriented polymers fluorinated in accordance with this invention may be used for wearing apparel, but they are of particular utility at this time in industrial applications such as filtering cloths, cloths for wire wrappings, cloths for wrapping electrodes, etc. Such fabrics may be used in laminating with various resinous binders in the same general manner that glass cloth has been used.

In sheet form many of the fluorinated polymeric crystalline resins may be used for a wide variety of industrial processes including photographic films, leather substitutes, as protective wrappings for substances or materials which are subject to deterioration due to heat, moisture or chemical. Furthermore, sheets of the polymer may, in some cases, be employed as adhesives to bind together the same or diverse materials, including glass, wood, paper or cloth.

In molded form many of the fluorinated polymers may be used for bearing surfaces. The treatment of a bearing surface of a polymer such as polymerized trifluorochloroethylene with fluorine produces a highly abrasion-resistant surface and one which is extremely heat resistant. The polymers may be used in brake linings and as packing materials in fiber form.

Moldings of polymers fluorinated in accordance with this invention are especially useful for chemical resistant containers, as for example, cosmetics, medicines, pharmaceuticals, etc. Molded polymers may also be used in the fabrication of electrical panel boards, switch or receptacle housings, parts for ignition systems for aeroplanes, automobiles, etc. Such polymers are preferably fluorinated after shaping into the form adapted for their intended use.

Products prepared in accordance with this invention are especially suitable for electrical wire insulation. Generally, a polymer which is easily extruded or coated is applied to a wire and thereafter the coating is fluorinated. If desired, the polymer may be partly fluorinated before application to the wire. Such coated wires posses excellent electrical characteristics and motors wound with such wire may be operated at elevated temperatures without danger of fire. Electrical wire produced in this manner is also valuable for use in certain resistance elements as leads for blasting caps and in those places where the wire will be exposed to organic and inorganic liquids, in vapors of a corrosive nature.

Finely divided fluorinated polymers produced in accordance with this invention may be flame-sprayed through, for example, a "Schori gun." The finely divided polymer may be obtained by grinding in a liquid medium, precipitated therefrom and screened.

My finely divided fluorinated polymers may be admixed with various other resins by chemical means. For example, a finely ground fluorinated polymer may be admixed with a phenol-formaldehyde resin in the sol stage as an inert filler and the composition subsequently ground in a mold in order to incorporate the fluorinated polymer therein as an integral part of the molded composition. Other resins which may be employed as binding agents include urea-formaldehyde resins, melamine-formaldehyde resins, copolymers of unsaturated alkyd resins and vinyl compounds such as styrene and allyl esters such as diallyl phthalate. The polymers may also be incorporated into castings, coatings or films of plastics including the aforementioned types of resins as well as other plastics such as the cellulose esters or ethers to render such materials flame-resistant.

Aliphatic high molecular weight polymers containing less than 5% of hydrogen may be fashioned into gaskets for various processes such as, for example, for use in bottle caps to prevent a liquid contained in a bottle from coming into contact with the cap, or as gaskets for glass, metal or plastic pipe flanges, couplings, etc. After fabrication, the gaskets are treated with fluorine in accordance with the foregoing description.

I claim:

1. A process as in claim 2 wherein the polymer is a fluorochloroethylene polymer.

2. A process which comprises fluorinating a synthetic aliphatic high-molecular-weight polymer of a halogenated ethylene monomer, said monomer containing a halogen atom selected from the group consisting of chlorine, bromine and iodine and said polymer containing from 0% to 2% of hydrogen, and continuing the fluorination until a marked changed in the properties of the said polymer has been effected.

3. A process which comprises fluorinating, by direct contact with gaseous fluorine diluted with an inert gas, a synthetic aliphatic high-molecular-weight polymer of a halogenated ethylene monomer, said monomer containing a halogen atom selected from the group consisting of chlorine, bromine and iodine and said polymer containing from 0% to 2% of hydrogen, and continuing the fluorination until the properties of the said polymer have been materially altered.

4. A process as in claim 3 wherein fluorination is effected at a temperature within the range of $-30°$ C. to $+100°$ C. and the polymer is one which has a molecular weight of at least 10,000.

5. A process which comprises fluorinating, by direct contact with gaseous fluorine admixed with nitrogen, a homopolymer of trifluorochloroethylene, and continuing the fluorination until the properties of the said polymer have been materially altered, the weight ratio of fluorine to nitrogen in the fluorine-nitrogen admixture initially being of the order of 1 to 10 at the beginning of the fluorination and being gradually increased until it is of the order of 10 to 1 near the end of the fluorination.

6. The process which comprises treating a shaped homopolymer of trifluorochloroethylene at $20°$–$30°$ C. and in an oxygen-free atmosphere with gaseous fluorine admixed with nitrogen, and continuing the said treatment for a period of not less than 24 hours thereby to fluorinate at least the outer surfaces of the said shaped polymer, the weight ratio of fluorine to nitrogen in the fluorine-nitrogen admixture initially being 1 to 10 at the beginning of the treating period and being gradually increased until it is 10 to 1 near the end of the treating period.

EDWARD L. KROPA.

REFERENCES CITED

The following references are of record in the file of this patent:

UNITED STATES PATENTS

| Number | Name | Date |
|---|---|---|
| 2,013,030 | Calcott et al. | Sept. 3, 1935 |
| 2,013,035 | Daudt et al. | Sept. 3, 1935 |
| 2,129,289 | Soll | Sept. 6, 1938 |
| 2,186,917 | Gaylor | Jan. 9, 1940 |
| 2,393,967 | Brubaker | Feb. 5, 1946 |

FOREIGN PATENTS

| Number | Country | Date |
|---|---|---|
| 677,071 | Germany | June 17, 1939 |
| 517,689 | Great Britain | Feb. 6, 1940 |

OTHER REFERENCES

Belmore et al., article in Ind. Eng. Chem., March 1947, pages 338–342.

Miller (1) article in J. Amer. Chem. Soc. vol. 62, pages 341–344, Feb. 1940.

Miller et al. (2), article in Ind. Eng. Chem. March 1947, pages 333–337.